US00RE45684E

(19) United States
(12) Reissued Patent
Jones et al.

(10) Patent Number: US RE45,684 E
(45) Date of Reissued Patent: Sep. 29, 2015

(54) APPARATUS FOR TWIST-TO-LOCK RETENTION OF A WHEEL

(71) Applicant: Hayes Bicycle Group Inc., Mequon, WI (US)

(72) Inventors: Christopher S Jones, Bay View, WI (US); Edward C Kwaterski, Cedarburg, WI (US); Joshua T. Pallesen, Grafton, WI (US); Nicholas W Pye, Carrboro, NC (US); Jonathon M Haggerty, Pewaukee, WI (US)

(73) Assignee: Hayes Bicycle Group, Inc., Mequon, WI (US)

(21) Appl. No.: 14/583,539

(22) Filed: Dec. 26, 2014

Related U.S. Patent Documents

Reissue of:
(64) Patent No.: 8,113,594
Issued: Feb. 14, 2012
Appl. No.: 12/550,590
Filed: Aug. 31, 2009

(51) Int. Cl.
*B60B 35/00* (2006.01)
*B60B 27/02* (2006.01)
(Continued)

(52) U.S. Cl.
CPC ..... *B60B 27/026* (2013.01); *B60B 35/004* (2013.01); *B60B 35/04* (2013.01); *B62K 25/02* (2013.01); *B60B 2310/306* (2013.01);
(Continued)

(58) Field of Classification Search
CPC B60B 27/026; B60B 35/04; B60B 2310/306; B60B 2360/10; B60B 2206/00; B60B 35/004; B60B 2310/316; B62K 25/02; B60Y 2200/13
USPC ..... 301/124.2; 280/279
See application file for complete search history.

(56) References Cited

U.S. PATENT DOCUMENTS 3,873,162 A 3/1975 Segawa
5,165,762 A 11/1992 Phillips
(Continued)

FOREIGN PATENT DOCUMENTS

CN 102001399 A 4/2011
TW 201109229 A1 3/2011
(Continued)

OTHER PUBLICATIONS

CAMLOC Quick-Operating Fasteners, brochure/product information including 991 F Series at pp. H1-H5, Alcoa Fastening Systems (Jan. 2009).
(Continued)

*Primary Examiner* — William Doerrler

(57) ABSTRACT

The invention relates to a quick release assembly for a bicycle, wherein the assembly comprises an axle having a first non-cylindrical end portion, a cylindrical central portion, and a second non-cylindrical end portion, wherein a diameter of one of the non-cylindrical end portions is larger than the diameter of the cylindrical central portion. The quick release assembly further comprises an insert having a non-cylindrical outer profile configured to be retained in a non-cylindrical opening and having a cam surface disposed therein, wherein the insert is sized to retain one of the non-cylindrical end portions of the axle therein. The assembly also includes a shaft sized to pass through the axle and having a cam follower on a first end and a handle on a second end, wherein the cam follower is configured to form a locking engagement with the cam surface upon an axial rotation of the handle.

57 Claims, 5 Drawing Sheets

(51) Int. Cl.
*B62K 25/02* (2006.01)
*B60B 35/04* (2006.01)

(52) U.S. Cl.
CPC ..... *B60B2310/316* (2013.01); *B60B 2360/10* (2013.01); *B60Y 2200/13* (2013.01); *B62K 2206/00* (2013.01)

(56) References Cited

U.S. PATENT DOCUMENTS

| | | | | |
|---|---|---|---|---|
| 6,089,675 | A | 7/2000 | Schlanger | |
| 6,412,803 | B1 | 7/2002 | Lalikyan et al. | |
| 7,090,308 | B2 | 8/2006 | Rose et al. | 301/110.5 |
| 7,494,145 | B2 | 2/2009 | Schroeder et al. | 280/276 |
| 7,530,645 | B2 | 5/2009 | Takachi | |
| 7,537,291 | B2 | 5/2009 | Hara | |
| 7,562,942 | B2 * | 7/2009 | D'Aluisio | 301/124.2 |
| 8,382,134 | B2 | 2/2013 | Bartlett | |
| 2007/0052285 | A1 | 3/2007 | Montague | |
| 2007/0145814 | A1 | 6/2007 | D'Aluisio | |
| 2008/0116658 | A1 | 5/2008 | Schroeder | |
| 2008/0191545 | A1 | 8/2008 | Laird | |
| 2008/0197600 | A1 | 8/2008 | Watarai | |
| 2008/0197601 | A1 | 8/2008 | Kanehisa et al. | |
| 2008/0197602 | A1 | 8/2008 | Watarai | |
| 2008/0197604 | A1 | 8/2008 | Hara | |
| 2008/0284127 | A1 | 11/2008 | Watarai | |
| 2008/0315678 | A1 | 12/2008 | Watarai | |
| 2009/0072613 | A1 | 3/2009 | Inoue et al. | |
| 2009/0102276 | A1 | 4/2009 | Mercat et al. | |
| 2009/0115241 | A1 | 5/2009 | Kanehisa | |
| 2009/0140571 | A1 * | 6/2009 | Chonan | 301/124.2 |
| 2011/0089661 | A1 * | 4/2011 | Kunstle | 280/281.1 |
| 2013/0099557 | A1 | 4/2013 | Bartlett | |

FOREIGN PATENT DOCUMENTS

| | | | |
|---|---|---|---|
| TW | I386342 | B1 | 2/2013 |
| WO | WO 2008/145497 | A1 | 12/2008 |

OTHER PUBLICATIONS

CAMLOC Quick-Operating ¼-Turn Fasteners, brochure/product information including 91 F Series at pp. A64-A66, Alcoa Fastening Systems (available on Internet at www.alcoa.com/fastening_systems_and_rings/aerospace/catalog/pdf/AFS_Camloc_Quarter_Turn_91F_Series.pdf on Dec. 4, 2014).

Hartlett Quick Release Axle System (instruction sheet) 2004.

CAMLOC, 911F Series brochure; Alcoa Fastening Systems; Jan. 2009; pp. H1-H5.

* cited by examiner

APPARATUS FOR TWIST-TO-LOCK RETENTION OF A WHEEL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

The present invention relates generally to a quick-release retention system for bicycle wheels or other components, and is more specifically directed to the retention of a wheel using a twist-to-lock configuration for securing a non-cylindrical axle to thru-axle fork dropouts.

Quick-release retention systems, particularly for use with bicycles, have been commonplace for many years. These quick-release retention systems allow for rapid connection (or disconnection) of a portion of the bicycle, such as a wheel to a fork, without the need for specialized tools. While the most common application of quick-release devices is for the securing of a bicycle wheel to the fork or frame of the bicycle, quick release devices are also used for other applications, such as securing a bicycle seat post to a seat tube of the bicycle frame.

While various types of quick-release retention systems have been devised, the most commonly used of these devices includes a 9 mm threaded skewer having a lever on one end and a fixed stop, such as a tightening nut, on the other end. The lever acts on a cam to exert a tightening force that is a function of both the geometry of the cam and the manual pre-adjustment of the center distance between the cam and the tightening nut, wherein the center distance is adjusted by the manual manipulation of the tightening nut. The tightening force is obtained by folding the lever in the direction of the skewer, from an open position to a closed position. The user must manually adjust the center distance by adjusting the tightness of the tightening nut until the lever is able to be folded such that the cam can be driven to provide a sufficient tightening force on the skewer.

Unfortunately, these conventional quick-release retention systems pose a number of problems. One major problem is that the tightening force on the skewer is almost entirely dependent upon the center distance adjustment made by the user upon installation of the wheel or other component. It is likely that the adjustments made by the user are inconsistent between different activations of the quick-release retention system, and these inconsistencies can cause possible component wear concerns. For example, if the center distance is adjusted to be too long, the tightening force may be insufficient, and the component (such as a wheel) may not adequately engage with the fork or bicycle frame, thereby causing the operator to readjust the quick-release system by releasing the quick-release and readjusting the tightening nut. On the other hand, if the center distance is adjusted to be too short, the axial traction force on the skewer may be too great, thereby risking breakage of the skewer or another element of the quick-release retention system. Furthermore, an overly-tightened skewer may produce compression forces on the hub bearings of a bicycle wheel, thereby causing substantial friction in the hub and potential early failure of the hub bearings. It is also common for the repeated tightening of the system to cause wear or galling on the various components, such as the bicycle hub and fork, with each application of the cam. In view of these potential issues with conventional quick-release retention systems, it is clear that the user-controlled tightening may lead to component wear issues, and at the very least results in substantial trial-and-error by the user in order to achieve the correct tightening force.

Yet another disadvantage related to the conventional quick-release retention systems is that the 9 mm skewers have a cylindrical cross-sectional shape which, when applied with bicycle wheels, are only compatible with fork dropout slots having similarly rounded configurations. However, some bicycle forks, in particular suspension forks used on off-road bicycles, have been redesigned to provide a non-cylindrical "thru-axle" configuration. Thru-axle configurations comprise substantially-enclosed, non-cylindrical dropouts, as opposed to conventional dropout slots. These changes came about due to the need to maintain torsional stiffness between the opposing fork legs. The rough terrain and aggressive, high-speed riding associated with off-ride bicycling leads to substantial torsional forces being exerted on the respective fork legs. It was found that using 20 mm axles having non-cylindrical end portions engaged with the substantially-enclosed, non-cylindrical dropouts of the forks effectively created a stiffer junction between the axle and the dropouts, thereby improving the torsional stiffness of the fork. The 20 mm axle configuration, however, is not compatible with the conventional quick-release systems known in the art, and thus the "thru-axle" configuration is typically be secured to the fork using alternative means, such as threaded bolts at each end of the axle. Such a configuration may necessitate special tools to disengage the wheel from the fork, causing the user to expend a great deal of time and effort. Furthermore, the 20 mm axle design is over-sized for many applications of off-road bicycling, thereby unduly increasing the weight and cost of the axle systems.

It would therefore be desirable to have a quick-release apparatus capable of securing a bicycle wheel to the fork or frame of the bicycle without the need for manual adjustment of the center distance between a cam-action lever and a threaded tightening nut. It would also be desirable to incorporate such a quick-release apparatus using a thru-axle configuration having a non-cylindrical interface such that torsional stiffness of the fork is maintained.

BRIEF DESCRIPTION OF THE INVENTION

The invention relates to a quick release assembly engageable with an enclosed dropout fork of a bicycle, wherein the assembly comprises an axle having a first non-cylindrical end portion, a cylindrical central portion, and a second non-cylindrical end portion, wherein a diameter of one of the first non-cylindrical end portion and the second non-cylindrical end portion is larger than the diameter of the cylindrical central portion. The quick release assembly further comprises an insert having a non-cylindrical outer profile configured to be retained in a non-cylindrical opening and having a cam surface disposed therein, wherein the insert is sized to retain one of the non-cylindrical end portions of the axle therein. The assembly also includes a shaft sized to pass through the axle and having a cam follower on a first end and a handle on a second end, wherein the cam follower is configured to form a locking engagement with the cam surface of the insert upon an axial rotation of the handle.

Another aspect of the invention relates to an apparatus for retaining a bicycle wheel, wherein the apparatus comprises hollow axle having a first end portion and a second end portion, the first end portion configured to be retained within a first enclosed dropout of a bicycle fork assembly. The apparatus also includes a dropout insert configured to retain the second end portion within a second enclosed dropout of the bicycle fork assembly and a cam insert affixed within the dropout insert. Additionally, the apparatus comprises a shaft sized to travel through the hollow axle, the shaft having a cam follower on a first end and a handle and tensioning assembly on a second end, wherein the cam follower is configured to fixedly engage the cam insert upon less than a single rotation of the shaft.

Another aspect of the invention relates to an assembly for securing a wheel to a bicycle, the assembly comprising a removable insert configured to be affixed within a first non-cylindrical dropout of a bicycle fork, the removable insert having a ramped cam surface disposed therein. The assembly further comprises an axle having a first non-cylindrical end portion and a second non-cylindrical end portion, wherein the first non-cylindrical end portion is configured to mate with an internal surface of the removable insert and the second non-cylindrical end portion is configured to mate with a second non-cylindrical dropout of the bicycle fork, and a skewer configured to travel through the axle, the skewer having a cam follower on a first end and a handle on a second end, wherein the cam surface of the skewer is configured to lockingly engage the ramped cam surface of the removable insert upon less than one full axial rotation of the handle.

Yet another aspect of the invention relates to a quick release assembly for a bicycle, wherein the quick release assembly comprises an axle having a first non-cylindrical end portion, a cylindrical central portion, and a second non-cylindrical end portion, wherein a diameter of one of the first non-cylindrical end portion and the second non-cylindrical end portion is larger than the diameter of the cylindrical central portion. The quick release assembly also comprises a shaft sized to pass through the axle and having a retention surface on a first end and a handle on a second end, and an insert configured to be retained in a non-cylindrical, thru-axle fork dropout and having a shaft interface therein, wherein the retention surface of the shaft is configured to form a locking engagement with the shaft interface of the insert upon an axial rotation of the handle.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

A system is shown that provides a quick-release configuration for a wheel, preferably a bicycle wheel. The quick-release configuration uses a twist-to-lock action on a shaft to secure the wheel to a bicycle fork or frame.

Figure 1:
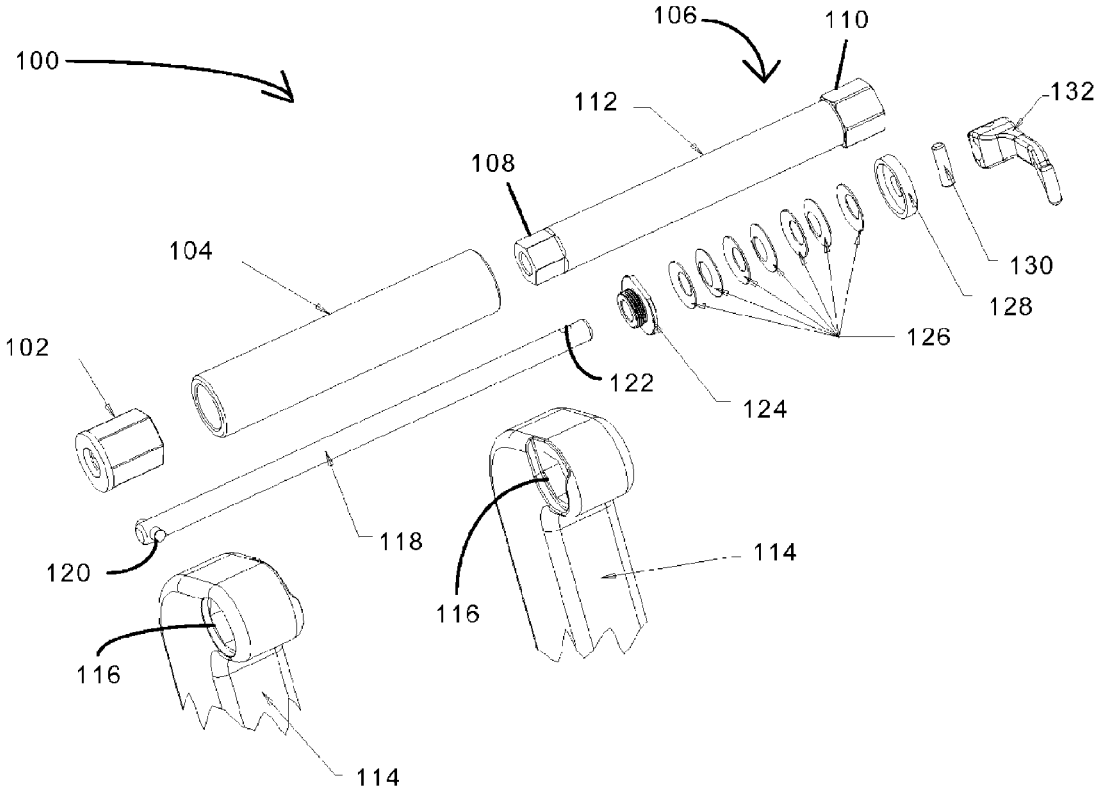
FIG. 1 is an exploded view of the quick-release system according to an embodiment of the invention.

FIG. 1 illustrates an exploded view of an exemplary embodiment of the invention. Quick-release system 100 comprises an insert 102 having a non-cylindrical outer profile, a hub 104, and an axle 106. While not shown, hub 104 comprises a plurality of bearings therein to enable axle 106 to rotate freely when axle 106 is received through a central axis of hub 104. Hub 104 may also be configured to include a plurality of openings to accept wheel spokes therein. Axle 106 is shown having respective non-cylindrical end portions 108, 110 and a cylindrical central portion 112. The diameter of non-cylindrical end portion 110 is larger than that of non-cylindrical end portion 108 and cylindrical central portion 112. In this way, axle 106 is sized to pass through a central axis of hub 104 such that only cylindrical central portion 112 is retained within hub 104, while non-cylindrical end portions 108, 110 extend beyond respective ends of hub 104. Cylindrical central portion 112 of axle 106 may have a diameter of 15 mm to conform to industry-standard hub sizes, but the invention is not limited as such. In fact, cylindrical central portion 112 may have a diameter of, for example, 12 mm for light-duty bicycles, or 20 mm for use on bicycles subject to more significant stresses, such as those designed for off-road downhill riding. However, it is to be understood that cylindrical central portion 112 may be of any suitable diameter to conform to the central axis of hub 104. While non-cylindrical end portions 108, 110 and non-cylindrical insert 102 may be of any non-cylindrical shape, it is advantageous that the end portions be hexagonal in shape.

Referring still to FIG. 1, quick-release system 100 engages a pair of fork legs 114 having substantially enclosed dropout openings 116 near an end of each respective fork leg 114. Dropout openings 116 have a non-cylindrical inner surface, wherein one of the dropout openings 116 is configured to retain insert 102 therein, while the other dropout opening 116 is configured to retain non-cylindrical end portion 110 of axle 106 therein. Non-cylindrical end portion 108 of axle 106 is correspondingly sized to fit within a non-cylindrical inner surface of insert 102, as will be discussed further below. The passage of axle 106 into dropout openings 116 forms what is known as a "thru-axle" design which, as will also be discussed in more detail below, provides for a more secure connection between the axle and the dropouts when compared to conventional slotted dropouts and cylindrical axles.

Quick-release system 100 also includes a shaft, or skewer, 118. Shaft 118 is sized to pass through a central axis of axle 106, and may be formed of any suitable material, such as steel, aluminum, or titanium. A cam follower 120 is disposed on a first end of shaft 118, while a pin hole 122 is located on a second end of shaft 118. Cam follower 120 may be a pin or other protrusion suitable to engage with a cam surface. As will be discussed with reference to subsequent figures, cam follower 120 is configured to engage a cam surface disposed within insert 102 upon rotation of shaft 118. Additionally, the second end of shaft 118 is configured to pass through a tensioning device 126. While tensioning device 126 may be any known tensioning means, in one embodiment one or more Belleville washer could be used as the tensioning device 126 bounded by a stator 124 and an end cap 128. After stator 124, tensioning device 126, and end cap 128 are disposed on shaft 118, a handle 132 is affixed to shaft 118 via a handle pin 130, which is designed to engage pin hole 122 in shaft 118. Alternatively, shaft 118 could itself be the tensioning device if it were desired to reduce the number of components and increase tolerances. In such an instance, shaft 118 would be composed of an elastic metallic material, such as spring-grade steel. Additionally, tensioning 126 could be a spring. Handle 132 is designed to allow a user to axially rotate shaft 118 using a simple twisting motion. While handle 132 is shown as a lever arm in FIG. 1, handle 132 may be a knob, a pin, or any other device capable of allowing a user to rotate shaft 118.

Figure 2:
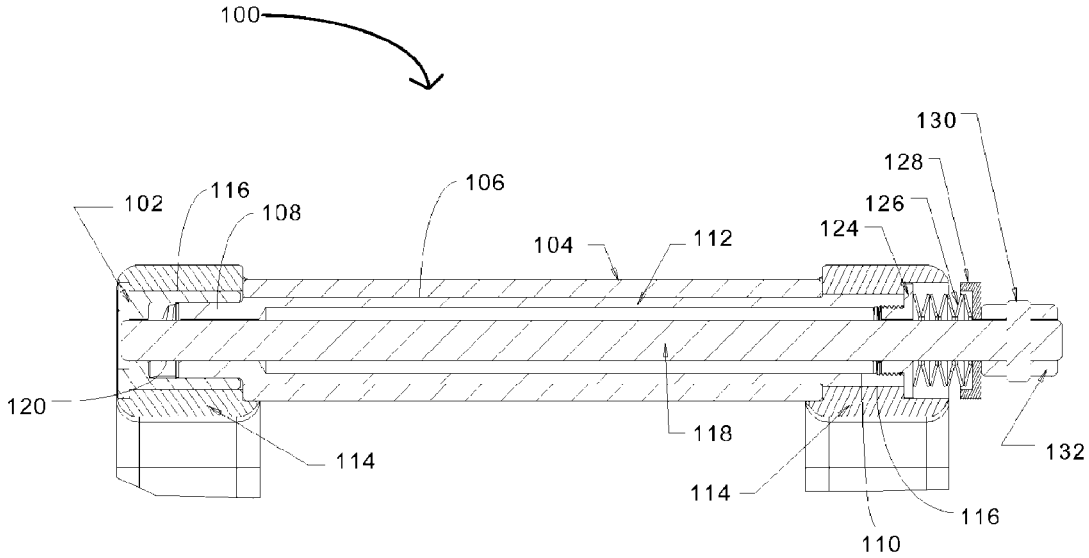
FIG. 2 is a cross-sectional view of the quick release system according to an embodiment of the invention.

Referring now to FIG. 2, a cross-sectional view of quick-release system 100, as assembled, is illustrated. As FIG. 2 shows, insert 102 is retained within a dropout opening 116 on an end of a fork leg 114. Insert 102 is preferably retained via a press-fit connection with dropout opening 116, but alternate methods of retention are also possible with this invention. For example, dropout opening 116 may comprise at least one pivotal clamp to securely retain insert 102. Non-cylindrical end portion 108 of axle 106 is tightly engaged with a non-cylindrical opening of insert 102, while non-cylindrical end portion 110 of axle 106 is sized to fit within the other dropout opening 116 of the other fork leg 114. In this way, axle 106 is engaged with respective fork legs 114 such that axle 106 is prevented from rotating, or slipping, in dropout openings 116. Such a fixed, non-cylindrical connection between non-cylindrical end portions 108, 110 of axle 106 and the respective dropout openings 116 allows torque to be transferred between fork legs 114, effectively using axle 106 as a torsion bar and greatly decreasing the torsional deflection of the system. Such torque transfer improves the stability of the bicycle while under operation, leading to increased performance and lessened wear on the components of quick-release system 100. The use of axle 106 as a torsion bar is particularly advantageous in forks which lack the traditional brake arch or brace, such as "inverted" fork assemblies, as the non-cylindrical connection between axle 106 and dropout openings 116 helps to decrease the torsional deflection that was typically controlled by the brake arch or brace.

FIG. 2 also shows that shaft 118 passes through axle 106 into dropout openings 116. To successfully engage quick-release system 100, a user must rotate handle 132 in a "locking" direction, thereby providing a corresponding rotation on shaft 118. As shaft 118 is rotated, cam follower 120 engages a ramped cam surface located within insert 102. Cam follower 120 pulls shaft 118 through axle 106 as shaft 118 is rotated, correspondingly pulling respective fork legs 114 inward. Eventually, cam follower 120 will reach a locking engagement with the cam surface of insert 102 such that shaft 118 can no longer be rotated in a locking direction. The amount of rotation of shaft 118 needed to reach this locking engagement is less than 360 degrees, and is conceivably less than 180 degrees (e.g., 120 degrees).

As shaft 118 is rotated to achieve the locking engagement with the cam surface of insert 102, tensioning device 126 imparts a reaction force on an opposite end of shaft 118 such that the locking engagement is maintained. Tensioning device 126 is partially retained within one of the dropout openings 116 between stator 124 and end cap 128. In this way, respective fork legs 114 are pulled inward upon rotation of shaft 118, allowing fork legs 114 to contact and slightly compress hub 104 at surfaces adjacent to respective dropout openings 116. Thus, locking engagement of cam follower 120 with the cam surface of insert 102 enables quick-release system 100 to securely engage a wheel with minimal user effort and without the possible over- or under-tightening of the system due to user error, as is common in conventional quick-release systems. To disengage the wheel, the user must simply rotate handle 132 in an "unlocking" direction opposite that of the locking direction, thereby allowing cam follower 120 to exit the locking engagement with the cam surface of insert 102. Such a rotational engagement/disengagement of quick-release system 100 enables the user to securely install a wheel using only one hand, thereby greatly simplifying wheel retention. Furthermore, because cam follower 120 is always lockingly engaged at the same position on the cam surface of insert 102, user error in achieving the correct locking position can be avoided.

Figure 3:
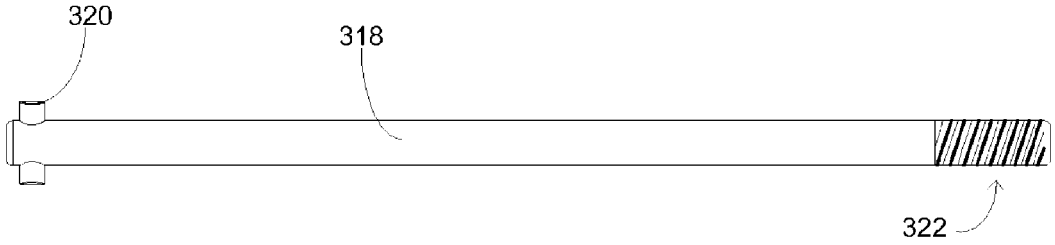
FIG. 3 is a side view of a shaft according to an embodiment of the invention.

FIG. 3 illustrates an alternative configuration for the shaft, or skewer, of the quick-release system. Unlike shaft 118 described with respect FIGS. 1 and 2 above, shaft 318 shown in FIG. 3 does not include a pin hole on which a handle is affixed via a handle pin. Instead, shaft 318 comprises a threaded region 322 on an end of shaft 318 opposite that of a cam follower 320. In this way, a handle (not shown) having a threaded region therein can be rotatably threaded onto threaded region 322. The axial position of the handle on shaft 318, and in turn the initial force of a tensioning device (not shown), can therefore be adjusted during the manufacturing process to account for tolerance variations in the system. When the distance between the handle and cam follower 320 is at a suitable position, the handle may be fixedly locked in position via, for example, a key pressed into slot of the handle.

Figure 4A:
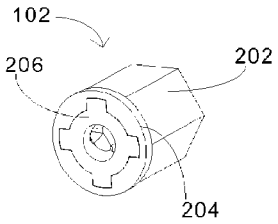
FIG. 4A is a three-dimensional view of a dropout insert according to an embodiment of the invention.
Figure 4B:
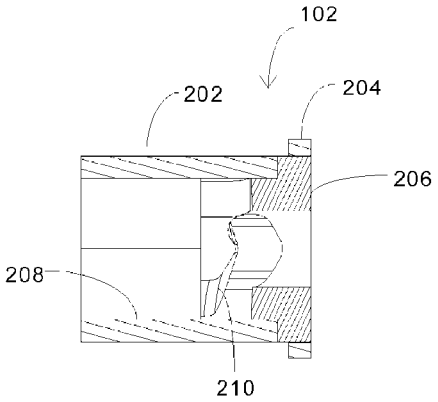
FIG. 4B is a cross-sectional view of the dropout insert according to an embodiment of the invention.
Figure 4C:
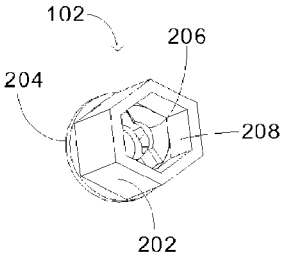
FIG. 4C is another three-dimensional view of the dropout insert according to an embodiment of the invention.

Referring now to FIGS. 4A-4C, a detailed view of insert 102 is shown. As FIG. 4A and FIG. 4C illustrate, insert 102 comprises a non-cylindrical outer surface region 202 and a cylindrical lip 204. Non-cylindrical outer surface region 202 is sized to fit within a dropout opening 116, as is shown above with respect to FIGS. 1 and 2. Ideally, insert 102 is press-fit into a dropout opening 116 to form a tight engagement, and cylindrical lip 204 acts to limit the depth in which insert 102 may travel into dropout opening 116. Insert 102 further comprises a cam-surface insert 206, which is separately affixed within insert 102 to provide the actual cam surface of insert 102. As the cross-section of insert 102 shown in FIG. 4B illustrates, cam-surface insert 206 engages with a non-cylindrical inner surface region 208, wherein cam-surface insert 206 is limited in the depth it may travel into insert 102. Cam-surface insert 206 comprises therein a ramped cam surface 210, which is configured to accept cam follower 120 located on shaft 118. As shaft 118 is rotated, cam follower 120 "rides" ramped cam surface 210 until reaching the end, or locking, position of ramped cam surface 210. By traveling along ramped cam surface 210 in this way, shaft 118 is pulled toward an end of insert 102, which thereby acts to assist in engaging the wheel in a locked position through a simple rotation of shaft 118. Furthermore, as insert 102 is removable from a dropout opening 116, insert 102 is also replaceable if damaged or worn. Such a replacement is far less costly than alternative approaches found in many conventional quick-release systems, where the dropout itself acts as a wear surface. In such a case, the entire fork may need to be replaced if the dropout was damaged or worn, adding substantial costs to the repair/replacement.

Figure 5A:
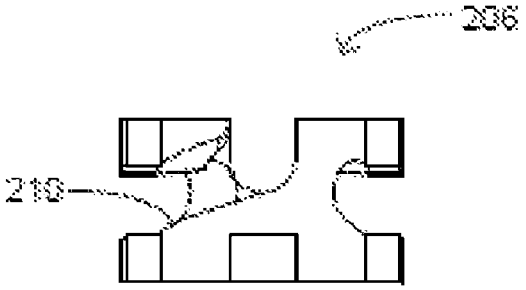
FIG. 5A is a side view of a cam insert according to an embodiment of the invention.
Figure 5B:
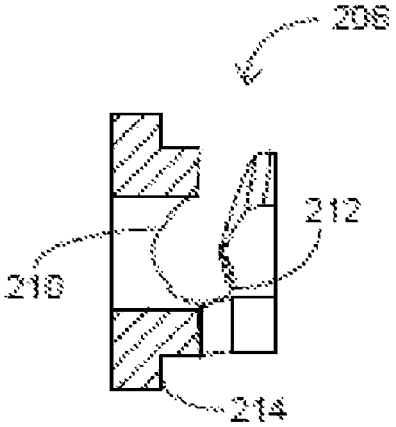
FIG. 5B is a cross-sectional view of the cam insert according to an embodiment of the invention.
Figure 5C:
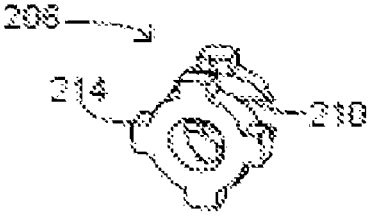
FIG. 5C is a three-dimensional view of the dropout insert according to an embodiment of the invention.

FIGS. 5A-5C illustrate a more detailed view of cam-surface insert 206. As FIGS. 5A-5C show, ramped cam surface 210 of cam-surface insert 206 is sized to accept cam follower 120, which travels along ramped cam surface 210 upon rotation of shaft 118. When cam follower 120 reaches a locking endpoint 212 of ramped cam surface 210, shaft 118 can no longer be rotated in a "locking" direction, and is thus in a locked position. By rotating shaft 118 in the opposite direction, cam follower 120 may be removed from the locked position, and thus the engagement of shaft 118 with insert 102 may be released. Preferably, cam-surface insert 206 is formed of a material having greater wear resistance than the material forming insert 102, as cam-surface insert 206 will be subject to significant wear during repeated engagements of cam follower 120 with ramped cam surface 210. For example, insert 102 may be made of aluminum or plastic, but cam-surface insert may be made of steel or another similarly wear-resistant material. By using such a wear-resistant material, the overall life of insert 102 may be increased. FIGS. 5B-5C also show retaining tabs 214, which act to limit the depth in which cam-surface insert 206 may travel into insert 102. Thus, when cam follower 120 is engaged with ramped cam surface 210, retaining tabs 214 provide a secure connection between cam-surface insert 206 and insert 102 to allow the wheel to be engaged in a locked position.

Therefore, in accordance with one aspect of the invention, a quick release assembly engageable with an enclosed dropout fork of a bicycle is shown, wherein the assembly comprises an axle having a first non-cylindrical end portion, a cylindrical central portion, and a second non-cylindrical end portion, wherein a diameter of one of the first non-cylindrical end portion and the second non-cylindrical end portion is larger than the diameter of the cylindrical central portion. The quick release assembly further comprises an insert having a non-cylindrical outer profile configured to be retained in a non-cylindrical opening and having a cam surface disposed therein, wherein the insert is sized to retain one of the non-cylindrical end portions of the axle therein. The assembly also includes a shaft sized to pass through the axle and having a cam follower on a first end and a handle on a second end, wherein the cam follower is configured to form a locking engagement with the cam surface of the insert upon an axial rotation of the handle . . . .

In accordance with another aspect of the invention, an apparatus for retaining a bicycle wheel is shown, wherein the apparatus comprises hollow axle having a first end portion and a second end portion, the first end portion configured to be retained within a first enclosed dropout of a bicycle fork assembly. The apparatus also includes a dropout insert configured to retain the second end portion within a second enclosed dropout of the bicycle fork assembly and a cam insert affixed within the dropout insert. Additionally, the apparatus comprises a shaft sized to travel through the hollow axle, the shaft having a cam follower on a first end and a handle and tensioning assembly on a second end, wherein the cam follower is configured to fixedly engage the cam insert upon less than a single rotation of the shaft.

In accordance with another aspect of the invention, an assembly for securing a wheel to a bicycle is shown, the assembly comprising a removable insert configured to be affixed within a first non-cylindrical dropout of a bicycle fork, the removable insert having a ramped cam surface disposed therein. The assembly further comprises an axle having a first non-cylindrical end portion and a second non-cylindrical end portion, wherein the first non-cylindrical end portion is configured to mate with an internal surface of the removable insert and the second non-cylindrical end portion is configured to mate with a second non-cylindrical dropout of the bicycle fork, and a skewer configured to travel through the axle, the skewer having a cam follower on a first end and a handle on a second end, wherein the cam surface of the skewer is configured to lockingly engage the ramped cam surface of the removable insert upon less than one full axial rotation of the handle.

In accordance with yet another aspect of the invention, a quick release assembly for a bicycle is shown, wherein the quick release assembly comprises an axle having a first non-cylindrical end portion, a cylindrical central portion, and a second non-cylindrical end portion, wherein a diameter of one of the first non-cylindrical end portion and the second non-cylindrical end portion is larger than the diameter of the cylindrical central portion. The quick release assembly also comprises a shaft sized to pass through the axle and having a retention surface on a first end and a handle on a second end, and an insert configured to be retained in a non-cylindrical, thru-axle fork dropout and having a shaft interface therein, wherein the retention surface of the shaft is configured to form a locking engagement with the shaft interface of the insert upon an axial rotation of the handle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A quick release assembly engageable with an enclosed dropout of a bicycle comprising:

an axle having a first non-cylindrical end portion, a cylindrical central portion, and a second non-cylindrical end portion, wherein a diameter of one of the first non-cylindrical end portion and the second non-cylindrical end portion is larger than the diameter of the cylindrical central portion;

an insert having a non-cylindrical outer profile, wherein the insert has a cam surface disposed therein and wherein the insert is sized to retain one of the non-cylindrical end portions of the axle therein; and a shaft sized to pass through the axle and having a cam follower on a first end and a handle on a second end, wherein the cam follower is configured to form a locking engagement with the cam surface of the insert upon an axial rotation of the handle.

2. The quick release assembly of claim 1 further comprising a tensioning device affixed between the first non-cylindrical end portion of the axle and the handle, the tensioning device configured to impart a reaction force on the second end of the shaft to maintain a locking force when the cam follower is engaged with the cam surface of the insert.

3. The quick release assembly of claim 1 wherein the insert is configured to be retained in a non-cylindrical dropout located on both a first leg portion and a second leg portion of a front fork assembly of a bicycle.

4. The quick release assembly of claim 1 wherein the cam follower forms a locking engagement with the cam surface of the insert within a single rotation of the shaft.

5. The quick release assembly of claim 4 wherein locking engagement of the cam follower with the cam surface of the insert is achieved with a rotation of the shaft of less than or equal to 180 degrees.

6. The quick release assembly of claim 1 wherein the axle is sized to fit through a hub assembly of a bicycle wheel.

7. The quick release assembly of claim 6 wherein the cylindrical central portion of the axle has a diameter of 12 mm, 15 mm, or 20 mm.

8. The quick release assembly of claim 1 wherein the cam surface disposed in the insert is removably affixed to an interior surface of the insert.

9. The quick release assembly of claim 8 wherein the cam surface is formed of a material having greater wear resistance than the material from which the insert is formed.

10. The quick release assembly of claim 1 wherein the cam surface is ramped to allow the cam follower of the shaft to axially follow thereon during rotation of the shaft.

11. The quick release assembly of claim 1 wherein the tensioning device is one of a Belleville washer, a set of Belleville washers, a spring, or wherein the shaft is composed of an elastic material.

12. An apparatus for retaining a bicycle wheel, the apparatus comprising:

a hollow axle having a first end portion and a second end portion, the first end portion configured to be retained within a first enclosed dropout of a bicycle assembly;

a dropout insert configured to retain the second end portion within a second enclosed dropout of the bicycle assembly;

a cam insert affixed within the dropout insert; and a shaft sized to travel through the hollow axle, the shaft having a cam follower on a first end and a handle and tensioning assembly on a second end, wherein the cam follower is configured to fixedly engage the cam insert upon less than a single rotation of the shaft.

13. The apparatus of claim 12 wherein both the first end portion and the second end portion of the hollow axle are non-cylindrical in shape.

14. The apparatus of claim 12 wherein cam follower is configured to fixedly engage the cam insert upon a rotation of shaft that is less than or equal to 180 degrees.

15. The apparatus of claim 12 wherein the hollow axle is sized to pass through a bicycle wheel hub.

16. An assembly for securing a wheel to a bicycle, the assembly comprising:

a removable insert configured to be affixed within a first non-cylindrical dropout of a bicycle, the removable insert having a ramped cam surface disposed therein;

an axle having a first non-cylindrical end portion and a second non-cylindrical end portion, wherein the first non-cylindrical end portion is configured to mate with an internal surface of the removable insert and the second non-cylindrical end portion is configured to mate with a second non-cylindrical dropout of the bicycle; and a skewer configured to travel through the axle, the skewer having a cam follower on a first end and a handle on a second end, wherein the cam surface of the skewer is configured to lockingly engage the ramped cam surface of the removable insert upon less than one full axial rotation of the handle.

17. The assembly of claim 16 wherein the assembly further comprises a tensioning device located substantially adjacent to the handle.

18. The assembly of claim 17 wherein the single tensioning device comprises one of a Belleville washer, a set of Belleville washers, a spring, or wherein the skewer is composed of an elastic material.

19. The assembly of claim 16 wherein the cam surface is removably affixed within the removable insert, the cam surface formed of a material different than the material of the removable insert.

20. A quick release assembly for a bicycle comprising:

an axle having a first non-cylindrical end portion, a cylindrical central portion, and a second non-cylindrical end portion, wherein a diameter of one of the first non-cylindrical end portion and the second non-cylindrical end portion is larger than the diameter of the cylindrical central portion;

a shaft sized to pass through the axle and having a retention surface on a first end and a handle on a second end; and an insert configured to be retained in a non-cylindrical, thru-axle dropout and having a shaft interface therein, wherein the retention surface of the shaft is configured to form a locking engagement with the shaft interface of the insert upon an axial rotation of the handle.

*21. The apparatus of claim 12 wherein the dropout insert is configured so that a cam surface is provided for the dropout insert to be engaged with the cam follower of the shaft.*

*22. The apparatus of claim 21 configured to provide a quick release assembly wherein the cam follower forms a locking engagement with the cam surface provided within the dropout insert within a single rotation of the shaft.*

*23. The apparatus of claim 21 wherein the cam surface is formed of a material having greater wear resistance than the material from which the dropout insert is formed.*

*24. The apparatus of claim 21 wherein the cam surface is ramped to allow the cam follower of the shaft to axially follow thereon during rotation of the shaft.*

*25. The apparatus of claim 21 wherein the cam surface of the dropout insert engages a retention surface on the shaft.*

*26. The apparatus of claim 25 wherein the retention surface is a ramped cam surface.*

*27. The apparatus of claim 12 wherein the dropout insert comprises an insert configured to be retained in a non-cylindrical dropout located on both a first leg portion and a second leg portion of a front fork assembly of a bicycle.*

*28. The apparatus of claim 12 wherein the cam insert is removably affixed to an interior surface of the dropout insert.*

*29. The apparatus of claim 12 wherein the tensioning assembly comprises a tensioning device comprising one of a Belleville washer, a set of Belleville washers, a spring, or wherein the shaft is composed of an elastic material.*

*30. The apparatus of claim 12 wherein the dropout insert comprises a removable insert.*

*31. The apparatus of claim 12 wherein the cam surface is provided on a removable insert.*

*32. The apparatus of claim 12 wherein when the cam follower is rotated into a locking endpoint the shaft can no longer be rotated in a locking direction and is in a locked position.*

*33. The apparatus of claim 32 wherein by rotating the shaft opposite to the locking direction the shaft is unlocked and can be released for removal from the dropout insert.*

*34. The apparatus of claim 12 wherein the dropout insert is retained in a press-fit connection within an opening on the end of fork leg.*

*35. The apparatus of claim 12 wherein the dropout insert comprises a cam surface affixed within to engage the cam follower of the shaft.*

*36. The apparatus of claim 12 wherein the cam insert is separately affixed within the dropout insert.*

*37. The apparatus of claim 12 wherein the cam insert comprises a cam surface insert.*

*38. The apparatus of claim 12 wherein the cam insert is removable from the dropout insert.*

*39. The apparatus of claim 12 wherein the dropout insert is removable from the dropout opening.*

*40. The apparatus of claim 12 wherein the cam insert is separate from the dropout insert.*

*41. The apparatus of claim 12 wherein the tensioning assembly is configured to impart a reaction force on the*

*second end of the shaft to maintain a locking force when the cam follower is engaged with the cam insert.*

*42. The apparatus of claim 12 wherein the position of the handle on the shaft is adjustable.*

*43. The quick release assembly of claim 1 wherein the position of the handle on the shaft is adjustable.*

*44. The assembly of claim 16 wherein the removable insert comprises a dropout insert providing the cam surface within to engage the cam surface of the skewer.*

*45. The assembly of claim 44 wherein a cam insert is separately affixed within the dropout insert.*

*46. The assembly of claim 45 wherein the cam insert comprises retaining tabs to engage the dropout insert.*

*47. The assembly of claim 16 wherein the cam surface of the skewer comprises a cam follower.*

*48. The assembly of claim 47 wherein the removable insert comprises a removable cam insert within a removable dropout insert providing the cam surface to engage the cam follower.*

*49. The assembly of claim 16 wherein the position of the handle on the skewer is adjustable.*

*50. The assembly of claim 20 further comprising a tensioning device affixed between the first non-cylindrical end portion of the axle and the handle, the tensioning device configured to impart a reaction force on the second end of the shaft to maintain a locking force when the shaft interface is engaged with a cam surface of the insert.*

*51. The assembly of claim 20 wherein the shaft interface comprises a cam follower.*

*52. The assembly of claim 51 wherein the insert comprises a removable dropout insert providing a cam surface to engage the cam follower.*

*53. The assembly of claim 52 wherein the insert comprises a removable cam insert within the removable dropout insert providing the cam surface to engage the cam follower.*

*54. The assembly of claim 20 wherein the locking engagement of the cam follower with the cam surface of the insert comprises fixed engagement achieved with a rotation of the shaft of less than or equal to 180 degrees.*

*55. The assembly of claim 20 wherein the insert comprises a dropout insert and a cam insert providing a retention surface formed of a material having a greater wear resistance than the material of the dropout insert.*

*56. The assembly of claim 20 wherein the shaft can be locked when rotated less than 360 degrees.*

*57. The assembly of claim 20 wherein the shaft can be locked when rotated less than 180 degrees.*

* * * * *